United States Patent
Stanley

(10) Patent No.: US 6,220,627 B1
(45) Date of Patent: Apr. 24, 2001

(54) OCCUPANT DETECTION SYSTEM

(76) Inventor: James G. Stanley, 21945 Daleview Dr., Novi, MI (US) 48374

(*) Notice: Subject to any disclaimer, the term of this patent is extended or adjusted under 35 U.S.C. 154(b) by 0 days.

(21) Appl. No.: 09/294,752

(22) Filed: Apr. 19, 1999

Related U.S. Application Data

(60) Provisional application No. 60/082,528, filed on Apr. 21, 1998, provisional application No. 60/082,408, filed on Apr. 20, 1998, and provisional application No. 60/082,443, filed on Apr. 20, 1998.

(51) Int. Cl.[7] .................................................. B60R 21/01
(52) U.S. Cl. ............................ 280/735; 180/272; 701/45
(58) Field of Search ........................ 280/735; 180/272; 342/72; 701/45

(56) References Cited

U.S. PATENT DOCUMENTS

| | | |
|---|---|---|
| 3,672,699 | 6/1972 | De Windt .................. 280/150 AB |
| 3,740,567 | 6/1973 | Atkins ........................ 307/10 SB |
| 3,767,002 | 10/1973 | Gillund ............................ 180/102 |
| 3,898,472 | 8/1975 | Long ............................ 307/10 SB |
| 4,300,116 | 11/1981 | Stahovec ............................ 340/32 |
| 4,625,329 | 11/1986 | Ishikawa et al. ...................... 382/1 |
| 4,683,373 * | 7/1987 | Tupman .............................. 180/272 |
| 4,796,013 | 1/1989 | Yasuda et al. ..................... 340/562 |
| 4,831,279 | 5/1989 | Ingraham ........................... 307/116 |
| 4,980,519 | 12/1990 | Mathews ............................... 178/19 |
| 5,071,160 | 12/1991 | White et al. ........................ 280/735 |
| 5,074,583 | 12/1991 | Fujita et al. ....................... 280/735 |
| 5,118,134 | 6/1992 | Mattes et al. ...................... 280/735 |
| 5,161,820 | 11/1992 | Vollmer .............................. 280/730 |
| 5,205,582 | 4/1993 | Shiga et al. ........................ 280/735 |
| 5,214,388 | 5/1993 | Vranish et al. ..................... 324/683 |
| 5,232,243 | 8/1993 | Blackburn et al. .................. 280/732 |
| 5,247,261 | 9/1993 | Gershenfeld ....................... 324/716 |
| 5,330,226 | 7/1994 | Gentry et al. ...................... 280/735 |
| 5,366,241 | 11/1994 | Kithil ................................ 280/735 |
| 5,398,185 | 3/1995 | Omura ............................ 364/424.05 |
| 5,404,128 | 4/1995 | Ogino et al. ..................... 340/425.5 |
| 5,411,289 | 5/1995 | Smith et al. ........................ 280/735 |
| 5,413,378 | 5/1995 | Steffens, Jr. et al. ............... 280/735 |
| 5,439,249 | 8/1995 | Steffens, Jr. et al. ............... 280/735 |
| 5,446,661 | 8/1995 | Gioutsos et al. ............... 364/424.05 |
| 5,454,591 | 10/1995 | Mazur et al. ...................... 280/735 |
| 5,474,327 | 12/1995 | Schousek ........................... 280/735 |
| 5,482,314 | 1/1996 | Corrado et al. .................... 280/735 |
| 5,490,069 | 2/1996 | Gioutsos et al. ............... 364/424.05 |
| 5,494,311 | 2/1996 | Blackburn et al. ................ 280/735 |
| 5,515,933 | 5/1996 | Meyer et al. ...................... 180/273 |

(List continued on next page.)

OTHER PUBLICATIONS

Lawrence Livermore Labs; "Micropower Impulse Radar (MIR)", from http://lasers.llnl.gov/lasters/idp/mir/files/MIR_info.html (printed on Apr. 17, 1998).

Smith, J.R.; "Field Mice: Extracting hand geometry from electric field measurements", IBM Systems Journal, vol. 35, Nos. 3&4, 1996.

Fink, Donald G. and Beaty, H. W.; Standard Handbook for Electrical Engineers 12th ed., McGraw–Hill, 1987, pp. 3–57 through 3–65.

Primary Examiner—Peter C. English
(74) Attorney, Agent, or Firm—Lyon P.C.

(57) ABSTRACT

An occupant detection system (10) for controlling the activation of an air bag inflator (40) incorporates a transmitter/receiver subsystem (20) that generates a beam of wave energy (28, 25) through a region that is occupied by a normally seated occupant and that is not occupied by either an out-of-position occupant or by a rear facing infant seat. If a normally seated occupant is detected from the interaction of an occupant with the beam of wave energy (28, 25), then the air bag inflator (40) is enabled. A range/proximity sensing subsystem (30) determines if an occupant is sufficiently close to an air bag inflator (40) to be at risk of injury by deployment thereof, and if so the air bag inflator (40) is disabled.

37 Claims, 8 Drawing Sheets

OTHER PUBLICATIONS

| | | | |
|---|---|---|---|
| 5,525,843 | 6/1996 | Howing | 307/9.1 |
| 5,528,698 | 6/1996 | Kamei et al. | 382/100 |
| 5,531,472 | 7/1996 | Semchena et al. | 280/735 |
| 5,549,323 | 8/1996 | Davis | 280/728.3 |
| 5,570,903 | 11/1996 | Meister et al. | 280/735 |
| 5,573,269 | 11/1996 | Gentry et al. | 280/735 |
| 5,589,838 | 12/1996 | McEwan | 342/387 |
| 5,602,734 | 2/1997 | Kithil | 364/424.055 |
| 5,612,876 | 3/1997 | Zeidler et al. | 364/424.055 |
| 5,618,056 | 4/1997 | Schoos et al. | 280/735 |
| 5,624,132 | 4/1997 | Blackburn et al. | 280/735 |
| 5,626,359 | 5/1997 | Steffens, Jr. et al. | 280/735 |
| 5,636,864 | 6/1997 | Hori | 280/735 |
| 5,653,462 | 8/1997 | Breed et al. | 280/735 |
| 5,661,490 | 8/1997 | McEwan | 342/387 |
| 5,691,693 | 11/1997 | Kithil | 340/439 |
| 5,694,320 | 12/1997 | Breed | 364/424.055 |
| 5,702,123 | 12/1997 | Takahashi et al. | 280/735 |
| 5,722,686 * | 3/1998 | Blackburn et al. | 280/735 |
| 5,731,781 | 3/1998 | Reed | 342/135 |
| 5,748,473 | 5/1998 | Breed et al. | 364/424.055 |
| 5,782,485 | 7/1998 | Takeda et al. | 280/735 |
| 5,802,479 | 9/1998 | Kithil et al. | 701/45 |
| 5,822,707 | 10/1998 | Breed et al. | 701/49 |
| 5,829,782 | 11/1998 | Breed et al. | 280/735 |
| 5,835,613 | 11/1998 | Breed et al. | 382/100 |
| 5,844,486 | 12/1998 | Kithil et al. | 340/573 |
| 5,845,000 | 12/1998 | Breed et al. | 382/100 |
| 5,848,802 | 12/1998 | Breed et al. | 280/735 |
| 5,871,232 | 2/1999 | White | 280/735 |
| 5,890,085 | 3/1999 | Corrado et al. | 701/47 |
| 5,901,978 | 5/1999 | Breed et al. | 280/735 |
| 5,943,295 | 8/1999 | Varga et al. | 367/99 |
| 5,954,360 | 9/1999 | Griggs, III et al. | 280/735 |
| 5,964,478 | 10/1999 | Stanley et al. | 280/735 |
| 5,983,147 | 11/1999 | Krumm | 701/45 |
| 6,007,095 | 12/1999 | Stanley | 280/735 |
| 6,014,602 | 1/2000 | Kithil et al. | 701/45 |
| 6,027,138 | 2/2000 | Tanaka et al. | 280/735 |
| 6,039,139 | 3/2000 | Breed et al. | 180/271 |

* cited by examiner

OCCUPANT DETECTION SYSTEM

CROSS-REFERENCE TO RELATED APPLICATIONS

The instant application claims the benefit of prior U.S. Provisional Application Ser. No. 60/082,408 filed on Apr. 20, 1998.

The instant application also claims the benefit of prior U.S. Provisional Application Ser. No. 60/082,443 filed on Apr. 20, 1998.

The instant application also claims the benefit of prior U.S. Provisional Application Ser. No. 60/082,528 filed on Apr. 21, 1998.

The following independent applications disclose matter related to the instant invention:

co-pending, commonly owned U.S. application Ser. No. 09/294,675, entitled "Occupant Detection System", filed on the same date as the instant application, claiming benefit of U.S. Provisional Application Ser. No. 60/082,523 filed on Apr. 21, 1998, and claiming benefit of U.S. Provisional Application Ser. No. 60/119,694 filed on Feb. 11, 1999;

co-pending, commonly owned U.S. application Ser. No. 09/294,680, entitled "Occupant Detection System", filed on the same date as the instant application, claiming benefit of U.S. Provisional Application Ser. No. 60/082,517 filed on Apr. 21, 1998;

co-pending commonly owned U.S. application Ser. No. 08/911,488, entitled "Occupant Position Sensing System", filed on Aug. 14, 1997, now U.S. Pat. No. 5,871,232 co-pending commonly owned U.S. application Ser. No. 08/911,148, entitled "Electric Field Sensing Air Bag Danger Zone Sensor", filed on Aug. 14, 1997, now U.S. Pat. No. 5,964,478; and co-pending commonly owned U.S. application Ser. No. 08/841,521, entitled "Occupant Position Sensing System", filed on Apr. 23, 1997, now U.S. Pat. No. 6,005,958.

The above-described applications are incorporated herein by reference.

TECHNICAL ART

The instant invention generally relates to occupant detection systems for controlling the activation of vehicular safety restraint systems and more particularly for determining the presence and position of an occupant for purposes of influencing the deployment of a safety restraint system responsive to a crash.

BACKGROUND OF THE INVENTION

A vehicle may contain automatic safety restraint actuators that are activated responsive to a vehicle crash for purposes of mitigating occupant injury. Examples of such automatic safety restraint actuators include air bags, seat belt pretensioners, and deployable knee bolsters. One objective of an automatic restraint system is to mitigate occupant injury, thereby not causing more injury with the automatic restraint system than would be caused by the crash had the automatic restraint system not been activated. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. For example, unbelted occupants subjected to severe pre-impact braking are particularly vulnerable to being out-of-position at the time of deployment. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

Air bags can be beneficial to any forward facing occupant when that occupant is a significant distance from the inflator door. Air bags, however, can be lethal to infants in rear facing infant seats (RFIS). Air bags can also be hazardous to forward facing occupants if they are too close to the inflator at the time of vehicle impact, such as when an unbelted occupant is subjected to severe pre-impact breaking. Air bag inflators are designed with a given restraint capacity, as for example, the capacity to protect an unbelted normally seated fiftieth percentile occupant when subjected to a 30 MPH barrier equivalent crash, which results in associated energy and power levels which can be injurious to out-of-position occupants; to small or frail occupants such as children, small women, or elderly occupants; or to infants in rear facing infant seats (RFIS). While relatively infrequent, cases of injury or death caused by air bag inflators in crashes for which the occupants would have otherwise survived relatively unharmed have provided the impetus to reduce or eliminate the potential for air bag inflators to injure the occupants which they are intended to protect.

Automotive manufacturers and NHTSA (National Highway Traffic Safety Administration) are searching for methods to disable air bags in situations where they may cause more harm than good. Airbags have been developed to open with enough force to restrain a 175 lb. adult in a high velocity crash. When these air bags are deployed on children in the front passenger seat of a vehicle, they may cause serious injuries. Another potentially harmful situation is when the occupant is very close to the air bag inflator module at the time of air bag deployment. Recent NHTSA data suggests that severe injuries due to this close proximity with the inflator can be reduced or eliminated if the air bag is disabled when the occupant is closer than approximately four to ten inches from the inflator door. The region proximate to air bag inflator where the occupant could be at risk of injury from the air bag is called the "at-risk" zone. The size of the at-risk zone is dependent upon the inflation characteristics of the associated air bag inflator and the velocity of the occupant with respect to the air bag module. Previous studies had suggested that the at-risk zone extended about eight inches from the inflator door.

One technique for mitigating injury to occupants by the air bag inflator is to reduce the power and energy levels of the associated air bag inflator, for example by reducing the amount of gas generant in the air bag inflator, or the inflation rate thereof. This reduces the risk of harm to occupants by the air bag inflator while simultaneously reducing the restraint capacity of the air bag inflator, which places occupants at greater risk for injury when exposed to higher severity crashes.

Another technique for mitigating injury to occupants by the air bag inflator is to control the rate of inflation rate or the capacity of the inflator responsive to a measure of the severity of the crash. The prior art teaches the use of multi-stage inflators having distinct independent compartmentalized stages and corresponding firing circuits, whereby the stages may be fired in delayed succession to control the effective inflation rate, or stages may be inhibited from firing to control the effective inflator capacity. The prior art also teaches the use of a hybrid inflator having a combination of stored gas and plural pyrotechnic gas generator elements which are independently fired. Furthermore, the prior art also teaches the use of control valves for controlling the gaseous discharge flow from the inflator. The inflation rate and capacity may be controlled responsive to the sensed or estimated severity of the crash, whereby a low severity would require a lower inflation rate or inflation capacity than a high severity crash. Since lower severity crashes are more likely than those of higher severity, and since such a controlled inflator would likely be less aggressive under lower severity crash conditions than those of higher severity, occupants at risk of injury by the air bag inflator because of their size or position will be less likely to be injured overall because they are more likely to be exposed to a less aggressive inflator. However, the risk of injury to such occupants would not be mitigated under the conditions of higher crash severity when the inflator is intentionally made aggressive in order to provide sufficient restraint for normally positioned occupants.

Yet another technique for mitigating injury to occupants by the air bag inflator is to control the activation of the inflator responsive to the presence and position of the occupant, thereby activating the inflator only when an occupant is positioned outside the associated at-risk zone of the inflator. Recent NHTSA data suggests that severe injuries due to close proximity with the inflator can be reduced or eliminated if the air bag is disabled when the occupant is closer than approximately 4 to 10 inches from the inflator door. Such a system for disabling the air bag inflator requires a occupant sensor that is sufficiently sensitive and robust to make such a determination, while not causing the air bag inflator to be disabled when otherwise required for providing occupant restraint.

Except for some cases of oblique or side-impact crashes, it is generally desirable to not activate an automatic safety restraint actuator if an associated occupant is not present because of the otherwise unnecessary costs and inconveniences associated with the replacement of a deployed air bag inflation system. The prior art teaches various means for detecting the presence of an occupant, or the recognition of an inanimate object in the passenger-seat of a vehicle for purposes of implementing such a system. For example, weight sensors can incorporated into the seat to detect the presence of an occupant.

Yet another technique for mitigating injury to occupants by the air bag inflator is to control the inflation rate or inflation capacity of the air bag inflator responsive to presence and position of an occupant. Such a control system would most preferentially be used in conjunction with a controllable inflation system responsive to crash severity, such as described above, wherein the occupant position inputs can be used to override otherwise overly aggressive air bag inflator controls which might otherwise be indicated by the particular crash severity level but which could be injurious to occupants of small stature or weight, or to infants in rear facing infant seats. Such a system for controlling the air bag inflator requires an occupant position sensor that is robust and sufficiently accurate, and that can distinguish and discriminate various occupant seating configurations and conditions.

The prior art teaches the use of sensors incorporated into the seat to detect the presence, weight, or seating position of the occupant. U.S. Pat. Nos. 3,672,699, 3,767,002, 5,161,820, 5,474,327, and 5,612,876 teach the use of occupant presence sensors incorporated into the seat to control the activation of the associated air bag inflator. U.S. Pat. No. 5,205,582 teaches a system for which the air bag inflator associated with an unoccupied seat is activated for accelerations above a second crash deceleration threshold, and otherwise deactivated. U.S. Pat. No. 5,074,583 teaches a plurality of sensors incorporated into the seat to detect occupant weight and seating position for purposes of controlling an air bag system. U.S. Pat. Nos. 5,232,243, 5,494,311, and 5,624,132 teaches an array of force sensing film elements incorporated into the seat for purposes of detecting the presence, weight, or position of an occupant for controlling either a multi-stage air bag inflator, an inflator vent valve, or the spatial orientation of the air bag inflator. U.S. Pat. No. 5,404,128 teaches the use of a vibration sensor incorporated into the seat to detect the subtle vibrations caused by the breathing and heart rhythms so as to determine whether or not a person is present. U.S. Pat. No. 5,573,269 teaches a means for correcting a seat weight measurement using seat back inclination angle and foot location. For some systems which incorporate seat weight as means for controlling the activation of an air bag inflator, the air bag inflator is required to be disabled if the sensed occupant weight is less than 30 Kg in order to assure that the air bag inflator is enabled for a fifth percentile female, but disabled for an infant in a rear facing infant seat. In some cases, as for example when the seat belt securing the infant seat is pulled too tight, an associated seat weight sensor could sense an apparent weight greater than the associated cut-off threshold so as to incorrectly enable the air bag inflator when a rear facing infant seat is present.

U.S. Pat. Nos. 5,071,160 and 5,118,134 teach the combination of sensing occupant position and/or velocity, and vehicle acceleration for purposes of controlling an inflator. Both of these patents teach by example the use of ultrasonic ranging to sense occupant position. U.S. Pat. No. 5,071,160 also teaches by example the use of a passive infrared occupant position sensor, while U.S. Pat. No. 5,118,134 teaches the use of a microwave sensor. U.S. Pat. No. 5,398,185 teaches the use of a plurality of occupant position sensors in a system for controlling safety restraint actuators in response thereto.

The prior art teaches the use of one or more ultrasonic beams reflected off the surface of an object to sense the location of the surface of the object. U.S. Pat. No. 5,330,226 teaches the combination of an ultrasonic ranging sensor mounted in the instrument panel and an overhead passive infrared sensor to sense occupant position for controlling a multi-stage air bag inflator or a vent valve connected thereto. U.S. Pat. Nos. 5,413,378, 5,439,249, and 5,626,359 teach the combination of ultrasonic sensors mounted in the dash and seat in combination with other seat sensors to detect the position and weight of the occupant for purposes of controlling an air bag inflator module. U.S. Pat. No. 5,482,314 teaches the combination of ultrasonic and passive infrared sensors together with associated signal processing for purposes of determining whether or not to deactivate a passive restraint system. U.S. Pat. Nos. 5,653,462 and 5,829,782 teach system for identifying and monitoring the contents of a passenger compartment by illuminating an object with a wave generator that directs waves towards the vehicle seat, and processing the received signal with a neural network or other pattern recognition system. Furthermore, U.S. Pat. No.

5,653,462 illustrates a system wherein the wave signal is first reflected off the windshield before reaching the vehicle seat.

The prior art also teaches the use of infrared beams reflected off the surface of an object to sense the location of the surface of the object. U.S. Pat. Nos. 5,446,661, and 5,490,069 teach an infrared beam directed by a transmitter at a point of reflection on the object. A receiver detects the radiation scattered from the point of reflection, and measures the distance of the point of reflection from the transmitter based upon a triangulation of the transmitted and received beams for purposes of controlling the activation of a safety restraint system. These patents also teach the combination of an infrared beam occupant position sensor with an acceleration sensor for purposes of controlling an air bag inflation system. U.S. Pat. No. 5,549,323 teaches the incorporation of a light beam occupant sensor into an air bag door. Furthermore, infrared beam sensors are commonly used as range-finders in automatic focusing cameras.

The prior art of U.S. Pat. Nos. 4,625,329, 5,528,698, and 5,531,472 teach the use of imaging systems to detect occupant position, the later two of which use this information for purposes of controlling an air bag inflator. U.S. Pat. Nos. 5,528,698, 5,454,591, 5,515,933, 5,570,903, and 5,618,056 teach various means of detecting the presence of a rear facing infant seat for purposes of disabling an associated air bag inflator.

The prior art also teaches the use of capacitive sensing to detect the presence, proximity, or position of an occupant. U.S. Pat. No. 3,740,567 teaches the use of electrodes incorporated into the base and back of the seat respectively, together with a capacitance responsive circuit, for purposes of discriminating between human occupants and animals or packages resting on an automobile seat. U.S. Pat. No. 3,898,472 teaches an occupant detection apparatus which includes a metallic electrode which is disposed to cooperate with the body of an automobile to form an occupant sensing capacitor, together with related circuitry which senses variations in the associated capacitance responsive to the presence of an occupant. U.S. Pat. No. 4,300,116 teaches the use of a capacitive sensor to detect people proximate the exterior of a vehicle. U.S. Pat. No. 4,796,013 teaches a capacitive occupancy detector wherein the capacitance is sensed between the base of the seat and the roof of the vehicle. U.S. Pat. No. 4,831,279 teaches a capacity responsive control circuit for detecting transient capacitive changes related to the presence of a person. U.S. Pat. Nos. 4,980,519 and 5,214,388 teach the use of an array of capacitive sensors for detecting the proximity of an object. U.S. Pat. No. 5,247,261 teaches the use of an electric field responsive sensor to measure the position of a point with respect to at least one axis. U.S. Pat. No. 5,411,289 teaches the use of a capacitive sensor incorporated into the back rest of the seat to detect occupant presence. U.S. Pat. No. 5,525,843 teaches the use of electrodes incorporated into the base and back of the seat for purpose of detecting the presence of an occupant, whereby the electrodes are substantially insulated from the vehicle chassis when the detection circuit is active. U.S. Pat. No. 5,602,734 teaches an array of electrodes mounted above the occupant for purposes of sensing occupant position based upon the influence of the occupant on the capacitance amongst the electrodes.

The prior art teaches systems—used alone or in combination—for suppressing the passenger air bag in dangerous situations. These systems incorporate various sensing technologies, for example:

a. Active infra-red sensors
b. Passive infra-red sensors (heat detectors)
c. Ultrasonic sensors
d. Capacitive sensors
e. Weight sensors (including various sensor technologies and measurement methods)
f. Child seat "tag" sensors
g. Vision-based systems An objective of these sensors is to determine when an occupant is very close to the inflator door and in the path of the deploying air bag, particularly out-of-position occupants and rear facing infants. Once detected, these systems need to employ the correct airbag deployment strategy such that the passenger side airbag is disabled when a rear facing infant seat is present, or when a person is within a specified region near the inflator door at the time a crash occurs. A complicating situation for the sensor is when there is an object, but no part of the occupant in the at-risk zone. Usually the air bag could still be beneficial for the occupant, especially if the object in the at-risk zone is a low density or low mass object like a newspaper or a map. Systems that only use ultrasonic and optical sensing mechanisms can be blocked by newspapers. Ultrasonic sensors in some configurations will be affected by environmental conditions (temperature, humidity, altitude) because the speed of sound changes depending on the environment. Any sensing system that needs a clear line of sight between the sensor and the occupant requires the sensor to be visible to the occupant.

Radar systems can be used to measure the range to an object; however, there is a perception that biological tissue may be adversely affected by the continuous exposure thereof to a radar beam.

Usually two or more of these sensors are used together in an attempt to identify child seats, small occupants, empty seats, large occupants and out-of-position occupants. The more sensors that are used, the better the chance for a high performance system. The costs of systems that use many sensors however, can become prohibitively high because of the large number of components and the increased assembly complexity of the vehicle.

Sensors which measure the distance between a point of reference and the surface of an object, such as ultrasonic or infrared beam sensors, are also vulnerable to false measurements, as would be caused for example by the presence of the extremities of an occupant, or by the presence of an object such as a scarf or newspaper held thereby, in proximity to the sensor. These types of sensors could be used to monitor the at-risk zone proximate the inflator door, but are subject to several disadvantages. In particular, infrared based systems usually incorporate a beam much narrower than the volume of the at-risk zone such that multiple beams may be required to reliably sense an object anywhere inside the at-risk zone. The incorporation of multiple beams results in extra cost, complexity, and potentially slowed response. Furthermore, both infrared beam and ultrasonic base sensors would require a significant amount of hardware proximate the inflator door if the at-risk zone proximate the inflator is to be monitored.

One disadvantage of many occupant detection systems is that they do not gather the most relevant information to determine if the occupant is in an at-risk zone around the inflator module. Occupant detection systems that are mounted above the passenger and look down on the seat area have the wrong physical perspective to directly monitor the region around the inflator door. Even if an ideal set of roof mounted sensors can reliably determine the occupant's gross position—which is a very challenging task,—the actual volume between the inflator door and the occupant may be blocked to the sensors by the occupant's body. If the criteria for controlling the activation of an air bag inflator were in part based on the proximity of the occupant's body to the air bag inflator door, then overhead sensors simply cannot reliably obtain the relevant information. Systems that only use ultrasonic and optical sensing mechanisms can be blocked by newspapers. Ultrasonic sensors in some configurations will be affected by environmental conditions (temperature, humidity, altitude) because the speed of sound changes depending on the environment. Any sensing system that needs a clear line of sight between the sensor and the occupant requires the sensor to be visible to the occupant.

Some prior-art occupant detection systems attempt to identify the type of occupant or object in the passenger side seat, for example to discriminate a rear facing infant seat from a normally seated adult in the passenger seat. However, this is generally a very challenging task as there are a large variety of possible situations. Sensor systems that depend upon distance measurements to identify occupant situations generally use information from a relatively small number of points in space for identifying the particular type of occupant in the seat from amongst many possibilities. Results from these systems can be unreliable because a particular situation can be significantly changed by simple and common acts such as tossing a blanket over the occupant. Systems than can distinguish the occupant situation may be limited by the inability to disable the air bag during a pre-impact breaking event. Moreover, the algorithms used in those systems are sometimes so complex that performance is sometimes unpredictable. While complex algorithms can sometimes makeup for the lack of direct sensory information, the same algorithms can sometimes create performance anomalies.

SUMMARY OF THE INVENTION

The instant invention overcomes the above-noted problems by providing an automotive occupant detection system that comprises two subsystems: a transmitter/receiver subsystem for identifying, from the interaction of the occupant with wave energy generated by the transmitter and detected by the receiver, whether there is a normally seated, forward facing occupant in the seat; and a range/proximity sensing subsystem for measuring the distance of an occupant from the inflator door. The wave energy transmitted and received by the transmitter/receiver subsystem is preferably of a type and frequency that is affected by the human body, such as ultrasonic, infrared, or visible, RF (radio frequency) or microwave electromagnetic energy, preferably an RF or microwave signal. The range/proximity sensing subsystem detects whether the occupant is near the inflator, and more particularly detects whether a human body part is within the at-risk zone of the inflator at the time of impact so that the air bag can be disabled or the inflation rate thereof can be reduced responsive thereto. The instant invention can be used to disable the passenger air bag in nearly all situations where the air bag can be a hazard.

In accordance with a first aspect of the instant invention, the transmitter/receiver subsystem comprises a transmitter and a receiver placed in the passenger compartment such that the line of sight therebetween is intersected by a normally seated forward facing occupant in the passenger seat, wherein the transmitter/receiver subsystem is responsive to the attenuation of a wave signal, preferably RF, by the occupant to determine the occupant situation. The transmitter and receiver both operate at a radio frequency that is easily absorbed by human tissue, but not by most materials used in the construction of child seats, blankets, children's toys, etc.

The transmitter/receiver subsystem comprising the RF transmitter and receiver is positioned in such a way that the RF energy at the receiver is significantly attenuated when any normally seated, forward facing occupant is in the passenger seat. Alternately, the RF energy is not attenuated in cases for which either the passenger is significantly out of position, the seat contains a RFIS, or the seat is empty. The system effectively acts like a switch. When the RF signal is attenuated the forward facing occupant is detected and the air bag is enabled. When the RF energy is not attenuated, the air bag is disabled. The instant invention makes a simple direct measurement to determine if there is a normally seated forward facing occupant in the front passenger seat. The frequency of the detection system is selected such that the human body attenuates the signal by reflecting and absorbing a great deal of the energy. As long as the signal is received and is not significantly attenuated, the system assumes that there is no forward facing occupant and disables the air bag.

In accordance with a second aspect of the instant invention, the transmitter/receiver subsystem comprises a microwave radar placed in the seat back. The radar operates at a frequency that is easily absorbed by human tissue, but not most materials used in the construction of child seats, blankets, children's toys, vehicle seat foam, etc. The microwave radar subsystem comprises a radar positioned in such a way that the radar beam is directed from behind the cushion in the seat back toward the vehicle roof. In cases when the passenger is extremely out of position, the seat contains a RFIS, or when the seat is empty, the RF energy is not attenuated and a clear reflection from a distance consistent with the distance to the vehicle roof is seen by the radar. When there is a normally seated occupant in the seat, there will be a strong reflection from a short distance, but no reflection from the vehicle roof since the RF energy will be absorbed by the occupant's body. The system effectively acts like a switch. When the radar sees no reflection coming from the roof of the vehicle the forward facing occupant is detected and the air bag is enabled. When the radar sees a reflection coming from the roof, the air bag is disabled. The instant invention makes a simple direct measurement to determine if there is a normally seated forward facing occupant in the front passenger seat. The frequency of the radar is selected such that the human body attenuates the signal by reflecting and absorbing the energy. If the radar signal reflects off the vehicle roof and is received by the radar receiving antenna, it is assumed that there is no forward facing occupant and the air bag will be disabled.

The range/proximity sensing subsystem comprises a ranging sensor that monitors the volume of space immediately around the air bag inflator door. The ranging sensor works independently of the transmitter/receiver subsystem and disables the air bag if an occupant's body is too close to the inflator door at the time of impact.

To be effective, the ranging sensor provides a direct measurement from which the presence of the passenger near the inflator is detected within sufficient time so that the air bag can be disabled while the passenger is still "flying" through the air during this pre-impact braking event. For example the ranging sensor can be a "capacitive" sensor, an optical range finder, an ultrasonic range finder, a radar or any other device that can detect the range between the inflator door and the occupant. If the ranging sensor is located on, or very near to, the inflator door itself, the at-risk zone can be constantly monitored. The response of the ranging sensor must be fast enough to disable the air bag if the occupant enters an at-risk zone immediately prior to the impact, as could occur during pre-impact braking. The range sensor is generally located in, or near, the air bag inflator door. Preferably, this range sensor detects whether part of the occupant's body is near the inflator without being influenced by low density objects such as newspapers. Performance like this can be achieved using capacitive sensors or radars. Responsive to the detection of a large mass of the occupant's body proximate to the inflator, the inflation rate of the air bag can be reduced or the air bag can be entirely disabled.

In either the first or second aspects of the instant invention, the transmitter/receiver subsystem can be adapted so as to be activated responsive to either a crash sensor or the range/proximity sensing subsystem, so as to reduce power consumption, extend the lifetime of the associated sensors, or reduce exposure of occupants to associated radiation from an associated transmitter.

Accordingly, one object of the instant invention is to provide an improved occupant position sensing system, which when incorporated into an occupant restraint system reduces the risk of injury to occupants by the associated air bag inflator.

A further object of the instant invention is to provide an improved occupant detection system that can determine if an occupant is positioned within the at-risk zone of the air bag inflator.

A further object of the instant invention is to provide an improved occupant detection system that can determine if an occupant is positioned proximate to the seat back.

A further object of the instant invention is to provide an improved occupant detection system that can determine if an occupant is positioned intermediate to the seat back and the air bag inflator.

A yet further object of the instant invention is to provide an improved occupant detection system that can sense rear facing infant seats.

The system of the instant invention disables the air bag either if no forward facing occupant is detected, or if the forward facing occupant is too close to the inflator module.

The instant invention directly measures characteristics that are important for assessing whether the air bag deployment could be dangerous. More particularly, the instant invention determines if there is a forward facing occupant, and whether the occupant is in a position that is extremely dangerous for the occupant. Accordingly, the air bag deployment decision is based upon direct measurements and not on probabilistic predictions using indirect evidence, which improves the predictability and reliability of the associated performance.

Furthermore, in accordance with the first aspect, the instant invention uses the passenger's body as a signal attenuator; in accordance with the second aspect, the instant invention uses the passenger's body to occlude the radar signal. This method of sensing is highly advantageous in that the sensor signal is dependent on the reflective and absorptive characteristics of the passenger and does not simply sense the outer surface of the occupant in the same way as do optical or ultrasonic sensors that sense the front profile of the occupant. The "outer surface" of the many practical occupant situations can change dramatically simply by throwing a blanket over the occupant or changing the seat position. This is even true of an empty seat situation. For RF or microwave signals, the absorptive and reflective characteristics are not substantially affected by a change to the outer surface of the occupant, as would result from the blanket situation. In accordance with the first aspect of the instant invention, the configuration of the transmitter and receiver is adapted to provide consistent signals. In accordance with the second aspect of the instant invention, the configuration of the antenna and the placement of the radar in the seat back is adapted to provide consistent signals.

These and other objects, features, and advantages of the instant invention will be more fully understood after reading the following detailed description of the preferred embodiment with reference to the accompanying drawings and viewed in accordance with the appended claims.

DETAILED DESCRIPTION OF THE PREFERRED EMBODIMENT(S)

Figure 1:
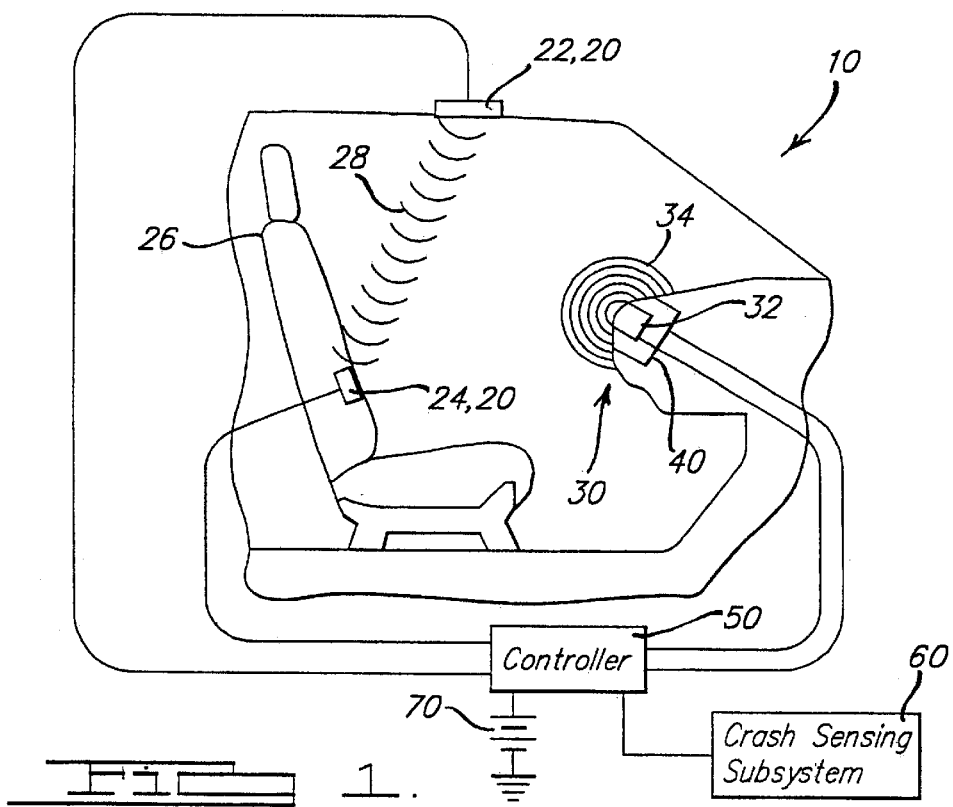
FIG. 1 illustrates a first aspect of the instant invention incorporated in the passenger-side of a vehicle, with an empty seat.

Referring to FIG. 1, in accordance with a first aspect, an occupant detection system 10 comprises a transmitter/receiver subsystem 20 and a range/proximity sensing subsystem 30.

The transmitter/receiver subsystem 20 comprises a transmitter 22 and receiver 24 operating at a frequency that is absorbed and reflected by human tissue. The transmitter 22 transmits a transmitted signal 28, comprising wave energy, to the receiver 24. Preferably, the operating frequency is chosen so that the associated RF signals have a depth of penetration into a water saturated material greater than several millimeters so that a wet towel dropped over the seat back doesn't attenuate the signal completely. For example, frequencies between about 100 MHz and about 30 GHz have such absorption characteristics. Preferably the operating frequency is between 300 MHz and 10 GHz.

The transmitter 22 and receiver 24 are each preferably located so that a rear facing infant seat (RFIS) does not block the line of sight between those components, but a normally seated forward facing occupant always will block that same line of sight—for any seat position or adjustment. For example, as illustrated in FIGS. 1–6, the transmitter 22 can be located anywhere above the headliner and forward of the forward position of the seat back that won't be blocked by the visor, and the receiver 24 can be located in the passenger seat back. Alternately, the locations of the transmitter 22 and receiver 24 can be switched with one another, so that the transmitter 22 is located in the seat back 26 and the receiver 24 is located in the headliner. However, the transmitter 22 is preferably located at the more distant of the two locations relative to the occupant—such as in the headliner—so as to minimize the exposure of the occupant to RF energy.

The transmitter/receiver subsystem 20 may comprise a micropower impulse radar, as for example taught by U.S. Pat. Nos. 5,589,838 or 5,661,490 which are incorporated herein by reference. Such systems are capable of relatively accurately measuring the distance to objects within 1–10 feet, and are capable of operating through fascia material, such as vehicle interior components.

The range/proximity sensing subsystem 30 comprising a range finding or proximity sensing device 32 determines if the occupant is within a predetermined at-risk zone 34 proximate to the air bag inflator 40. The range finder could use capacitive, ultrasonic, optical (including infrared, or vision based systems), or radar technologies. Preferably, the range/proximity sensing subsystem 30 is adapted for distinguishing animate from inanimate objects, as is possible with capacitive or passive infrared sensors.

Figure 2:
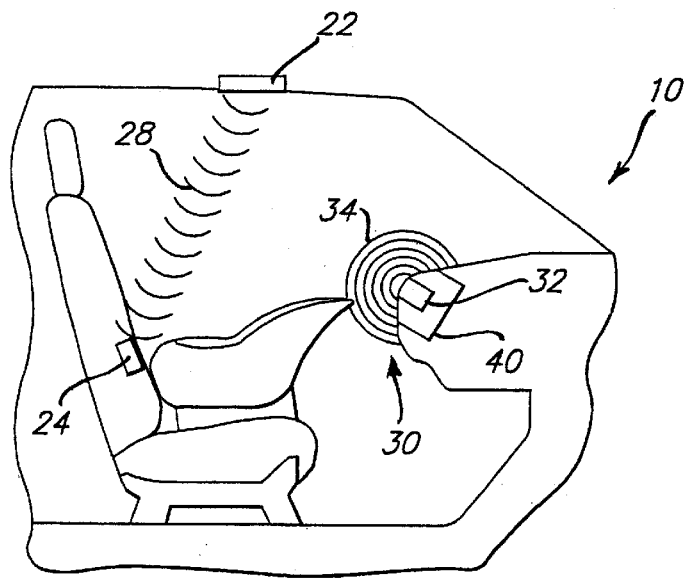
FIG. 2 illustrates a first aspect of the instant invention incorporated in the passenger-side of a vehicle, with a rear facing infant seat (RFIS) on the seat.
Figure 3:
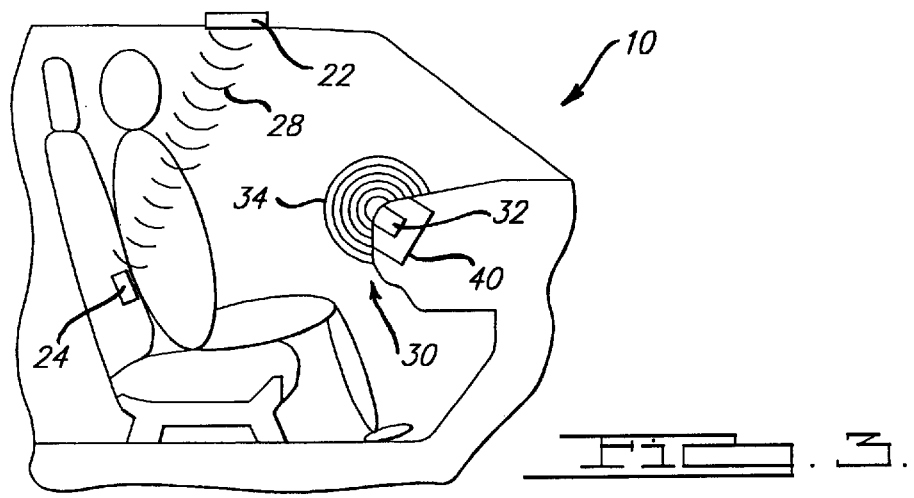
FIG. 3 illustrates a first aspect of the instant invention incorporated in the passenger-side of a vehicle, with a normally seated occupant in the seat.
Figure 6:
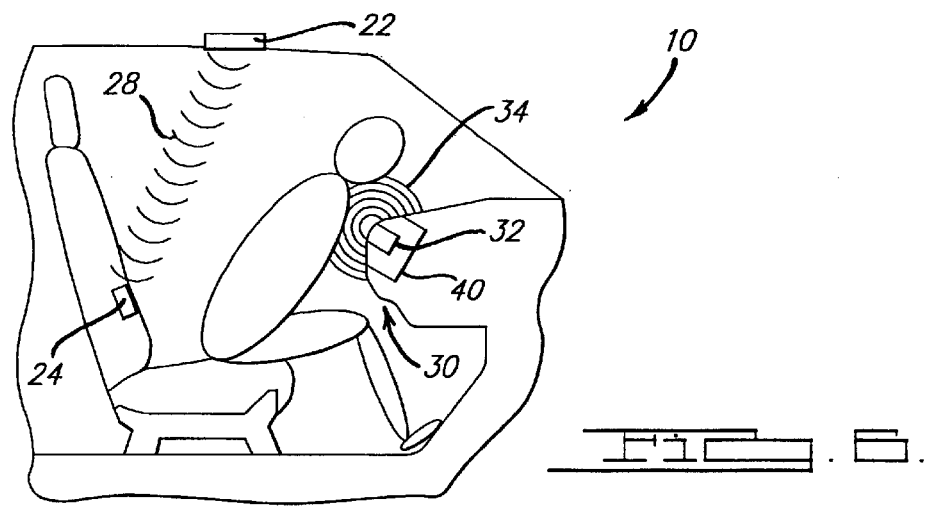
FIG. 6 illustrates a first aspect of the instant invention incorporated in the passenger-side of a vehicle, with a substantially out-of-position forward leaning occupant in the seat wherein the occupant is proximate the at-risk zone of the air bag inflator.
Figure 17:
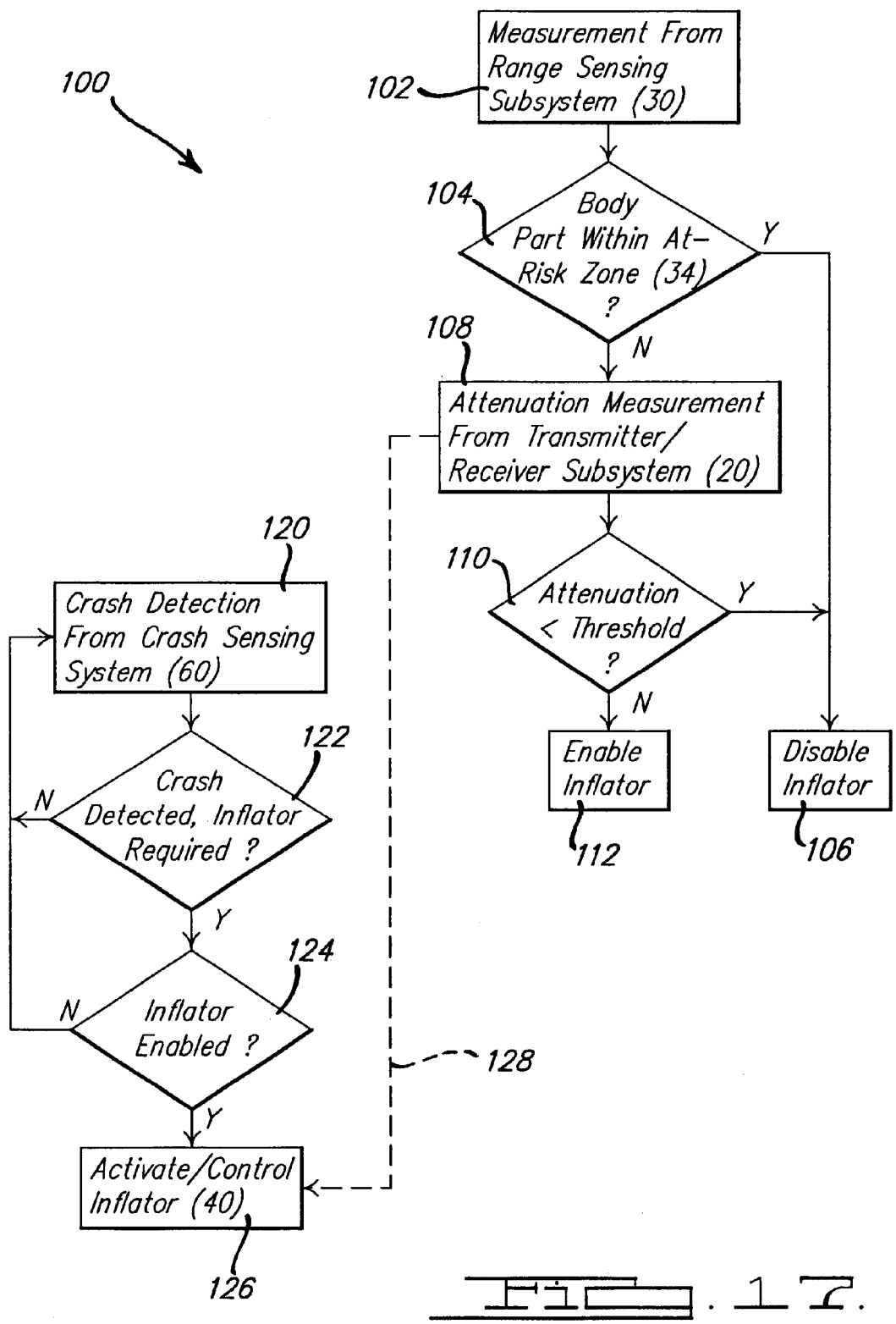
FIG. 17 illustrates a flow chart of control logic in accordance with the first aspect of the instant invention.

The occupant detection system 10 determines whether the air bag will deploy by determining if there is a human body seated against the seat back or is very close to the air bag inflator 40. The enable decision for the air bag inflator 40 is in accordance with following system logic, as illustrated by the process (100) in FIG. 17:

a. If in step (104) from the measurement by the range/proximity sensing subsystem 30 in step (102) there is a body part too close to the air bag inflator 40, i.e. within the at-risk zone 34, then the air bag inflator 40 is disabled in step (106). This scenario is illustrated in FIG. 6. Alternately, the air bag inflator 40 is also disabled if an object such as a rear facing infant seat is detected within the at-risk zone 34, as is illustrated in FIG. 2. Typically, however, a rear facing infant seat is detected by the transmitter/receiver subsystem 20.

b. Otherwise, if in step (110) from the attenuation measurement of step (108) by the transmitter/receiver subsystem 20 the RF signal attenuation between the transmitter 22 and receiver 24 is not sufficiently large to indicate that there is a person seated against the seat back 26 then the air bag inflator 40 is disabled in step (106). This scenario is illustrated in FIGS. 1, 2, 5, and 6. Alternately, under these circumstances, the air bag inflator 40 can be activated with a softened inflation characteristic. The occupant detection system 10 may be further adapted to measure the duration of time over which the attenuation is less than a threshold, and to reduce the power of—or disable—the safety restraint system if the duration of the time exceeds a threshold.

c. Otherwise, if the RF signal attenuation between the transmitter 22 and receiver 24 is sufficiently large to indicate that there is a person seated against the seat back and there is no body part near to the air bag inflator 40 then the air bag inflator 40 is enabled in step (112). This scenario is illustrated in FIGS. 3 and 4.

Referring to FIG. 1, the transmitter/receiver subsystem 20, the range/proximity sensing subsystem 30, the air bag inflator 40 and a crash sensing subsystem 60 are operatively coupled to a controller 50 powered by a source of power 70. If in step (124) the air bag inflator 40 is enabled by transmitter/receiver subsystem 20 and the range/proximity sensing subsystem 30, in step (126) the controller 50 activates the air bag inflator 40 responsive to a crash of sufficient severity as detected by the crash sensing subsystem 60 in steps (120, 122). The air bag inflator 40 may comprise one or more inflator stages, wherein a multi-stage inflator provides for the control of the associated inflation characteristic by the controller 50, responsive (128) to the attenuation measurement from the transmitter/receiver subsystem 20.

Figure 4:
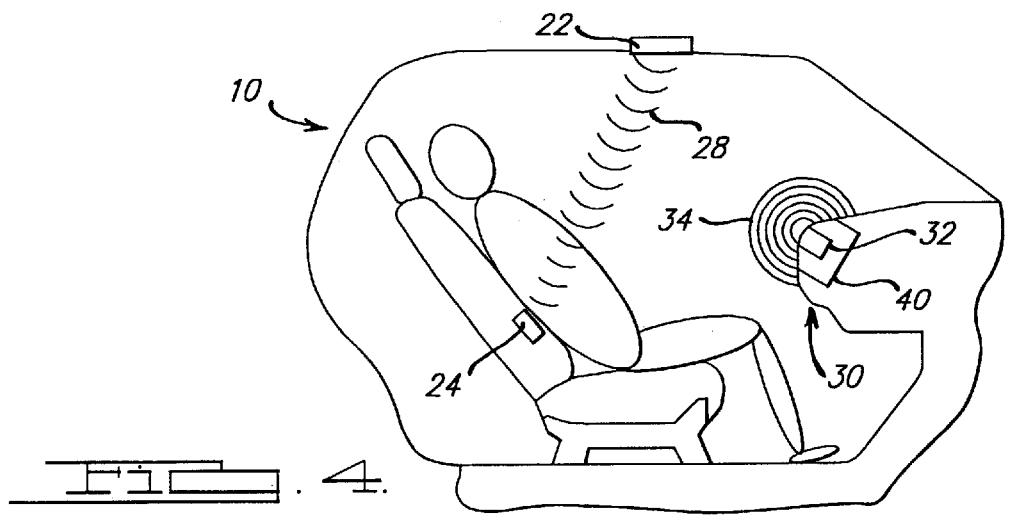
FIG. 4 illustrates a first aspect of the instant invention incorporated in the passenger-side of a vehicle, with a rearward leaning occupant in the seat.

The occupant detection system 10 provides the appropriate enable decision for nearly all typical situations including situations for which the occupant is reclined back in the passenger seat, as illustrated in FIG. 4, or for which the occupant's head or torso are in the at-risk zone 34 of the air bag inflator 40, as illustrated in FIG. 6.

Figure 5:
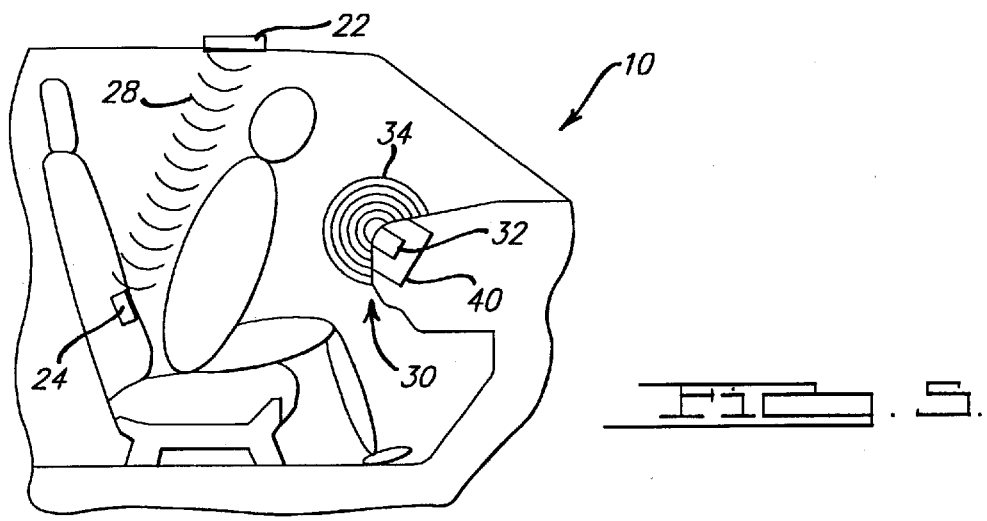
FIG. 5 illustrates a first aspect of the instant invention incorporated in the passenger-side of a vehicle, with a forward leaning occupant in the seat.

Another situation that is possible, but less likely, occurs when the occupant is leaned forward, but not in the at-risk zone 34, as illustrated in FIG. 5. If this situation is only temporary, the air bag would stay enabled as long as the occupant is not detected in the at-risk zone 34. Alternately, for a safety restraint system with a controllable air bag inflator 40, the inflation characteristic may be softened. If this situation persists for many seconds, the system would either 1) be forced to assume that there is a rear facing infant seat and thus disable the air bag, or 2) activate the air bag inflator 40 with a softened inflation characteristic if the air bag inflator 40 is controllable.

One potential problem of the system as described hereinabove is the possibility of signal reflections off the interior walls of the vehicle, the driver seat, or any other surface that allows some of the transmitted signal to bypass the normally seated occupant.

One way of mitigating the effects of signal reflections is to use highly directional antennas at both the transmitter 22 and the receiver 24, each directed along the direct line of sight therebetween. Accordingly, amplitude of any signal that is not in the direct line of sight is reduced because of the associated reduced antenna gain along the associated directions. Since the seat position can shift and the seat back angle can change, the gain pattern of the antennas must account for this relative motion. A fan shaped antenna pattern where the center line of the seat is roughly in the plane of the fan pattern is preferred. The angular width of the fan pattern depends on the maximum excursion of the receiver due to the variation of seat position and seat back angle.

Another way of mitigating the effects of signal reflections is to gate the receiver so as to be only responsive to signals following the direct path between the transmitter 22 and the receiver 24, thereby ignoring reflected signals that inherently follow a longer path with an associated longer propagation time. Accordingly, relatively small, simple antennas—albeit having relatively broad radiation patterns—may be incorporated in the transmitter 22 and the receiver 24, provided that they are used in combination with a means of timing the receiver that is sufficiently accurate and resolvable to accept all possible direct path signals associated with various seating configurations while rejecting the associated multi-path signals. Variations in seat travel and seat back angle result in corresponding variations in the path length between the transmitter and the receiver thereby affecting the associated gating interval.

If for all possible seating configurations the shortest multi-path distance is longer than the longest direct-path distance, the associated ambiguity resulting therefrom can be resolved by separately measuring or determining the shortest path distance and associated travel time so as to be able to establish the associated gate interval that filters out the multi-path signals for any given seating configuration. The distance between the transmitter 22 and the receiver 24 can be measured using another device that measures the propagation time between the transmitter and the receiver. Preferably, the propagation time measurement is made using a RF signal having a frequency that can penetrate through an occupant, whereas the occupant detection measurement is made with a RF signal having a frequency that cannot penetrate through an occupant. The combined system would determine the distance to the receiver and then measure the attenuation of a signal traveling along the direct-path between the transmitter 22 and the receiver 24.

Figure 7:
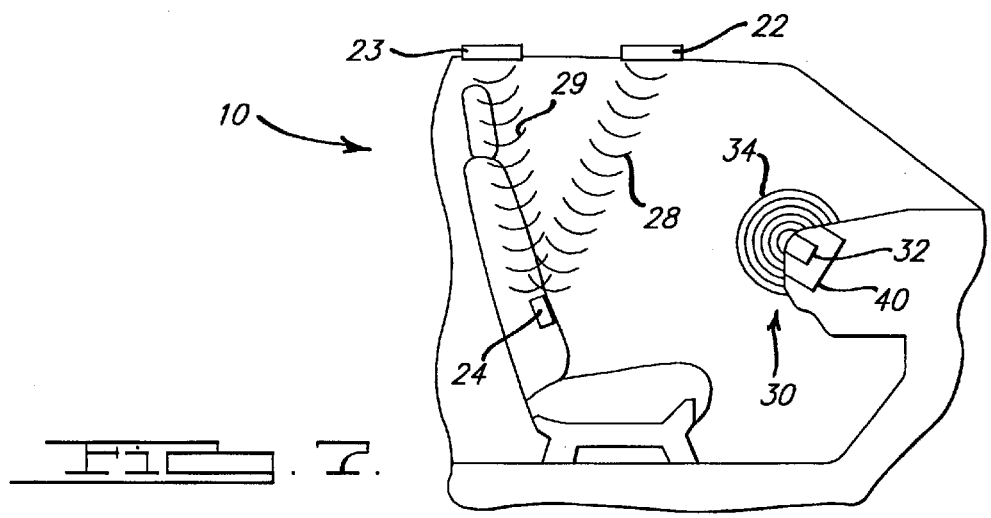
FIG. 7 illustrates a second embodiment of a first aspect of the instant invention incorporated in the passenger-side of a vehicle, with an empty seat.

Alternatively, as illustrated in FIG. 7, a second transmitter 23 can be provided to determine the distance between the first transmitter 22 and the receiver 24, wherein the second transmitter 23 is located such that the direct-path between the second transmitter 23 and the receiver 24 would not be blocked by an occupant. For example, the second transmitter 23 can be located behind the passenger seat and near the vehicle roof. The second transmitter 23 transmits a second transmitted signal 29 to the receiver 24, and the distance therebetween is determined by the time-of-flight of the second transmitted signal 29, as for example in accordance with U.S. Pat. No. 5,589,838. Accordingly, first the location of the receiver 24 is determined using the signal from the second transmitter 23, and then the presence of an occupant is determined using the signal from the first transmitter 22, wherein the distance measured between the second transmitter 23 and the receiver 24 is used to set the gating interval for detecting the transmitted signal 28 from the first transmitter 22.

Figure 8:
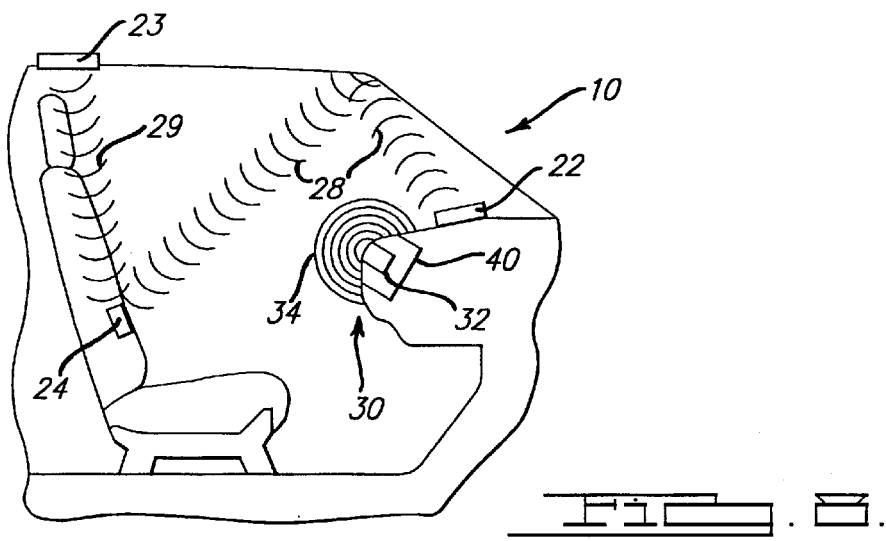
FIG. 8 illustrates a third embodiment of a first aspect of the instant invention incorporated in the passenger-side of a vehicle, with an empty seat.

Referring to FIG. 8, the transmitter 22 may be alternately disposed within the vehicle interior at a location from which the transmitted signal 28 is first reflected off a reflective surface of the vehicle interior before reaching the receiver 24. Such an arrangement provides for greater flexibility in locating elements of the transmitter/receiver subsystem 20 both for convenience in packaging and so that the path of the transmitted signal 28 therebetween is occluded by the occupants positioned such that the safety restraint system should be deployed, and is not occluded by the occupants positioned such that the safety restraint system should not be deployed.

Figure 9:
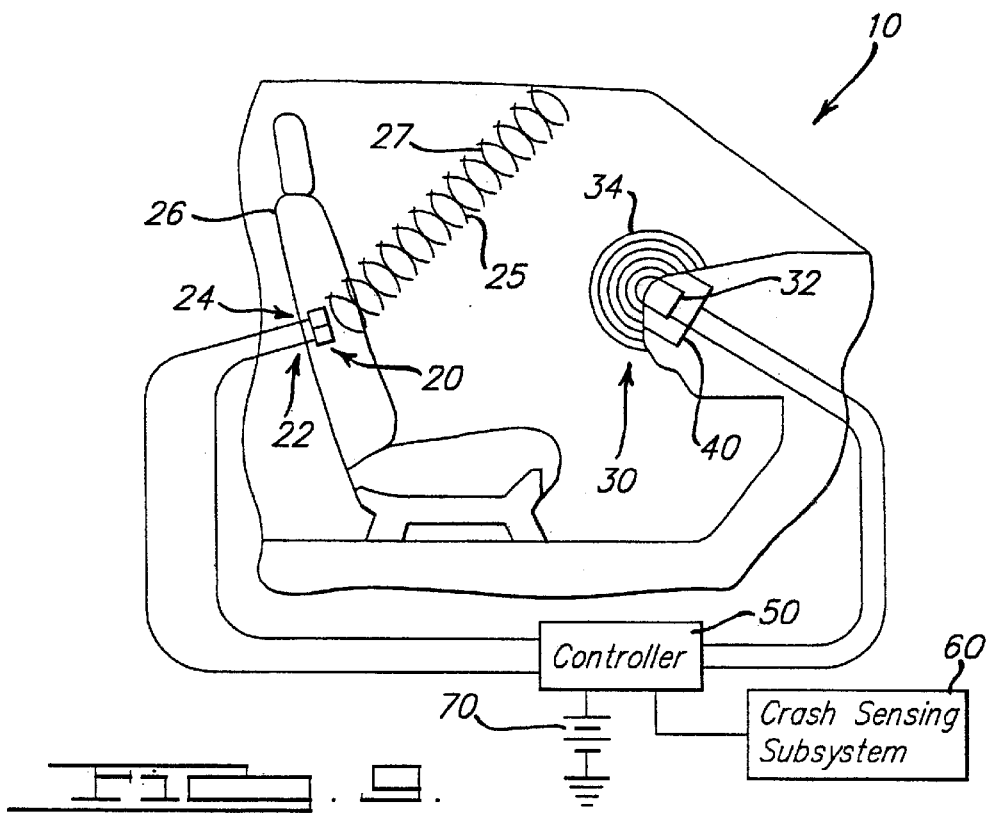
FIG. 9 illustrates a second aspect of the instant invention incorporated in the passenger-side of a vehicle, with an empty seat.

Referring to FIG. 9, in accordance with a second aspect, an occupant detection system 10 comprises a transmitter/receiver subsystem 20 and a range/proximity sensing subsystem 30.

The transmitter/receiver subsystem 20 comprises a microwave radar transmitter 22 and receiver 24 operating at a frequency that is absorbed and reflected by human tissue. Preferably, the operating frequency is chosen so that the associated RF signals have a depth of penetration into a water saturated material greater than several millimeters so that a wet towel dropped over the seat back doesn't attenuate the signal completely. For example, frequencies between about 100 MHz and about 30 GHz have such absorption characteristics. Preferably the operating frequency is between 300 MHz and 10 GHz. Generally, a radar signal is returned from the surface of an occupant, notwithstanding the bulk absorptive characteristics of the occupant. The strength of the returned signal 27 is influenced by the angle of the associated reflective surface. The microwave radar transmitter 22 and receiver 24 is adapted to measure distances within a range of approximately one meter, corresponding to the distance between the seat back and the vehicle roof.

The transmitter 22 has an associated transmitting antenna oriented to direct the RF energy from the front of the seat back up towards the vehicle roof. The receiver 24 has an associated receiving antenna oriented such that signals arriving from directions other than from the vehicle roof are significantly attenuated. More particularly, the transmitting and receiving antennas are preferably oriented so that a normally seated forward facing occupant always blocks the beam path between the transmitter/receiver subsystem 20 and the vehicle roof and a rear facing infant seat never blocks the same beam path—for any seat position or adjustment. It may be advantageous to separate the transmitting and receiving antennas as described hereinbelow.

A transmitted signal 25 transmitted by the transmitter 22 is reflected by a reflective surface and returns as a returned signal 27 to the receiver 24. The receiver 24, or a controller 50 operatively coupled thereto, measures the attenuation of the received signal, and measures the distance to the reflective surface for example, from the transit time of the transmitted 25 and returned 27 signals, as in a pulse mode or noise coded radar as for example taught by U.S. Pat. Nos. 5,589,838, 5,661,490, or 5,731,781, which are incorporated herein by reference. Alternately, the range can be measured from the frequency shift associated with an linear frequency modulated continuous wave (LFMCW) radar.

Figure 10:
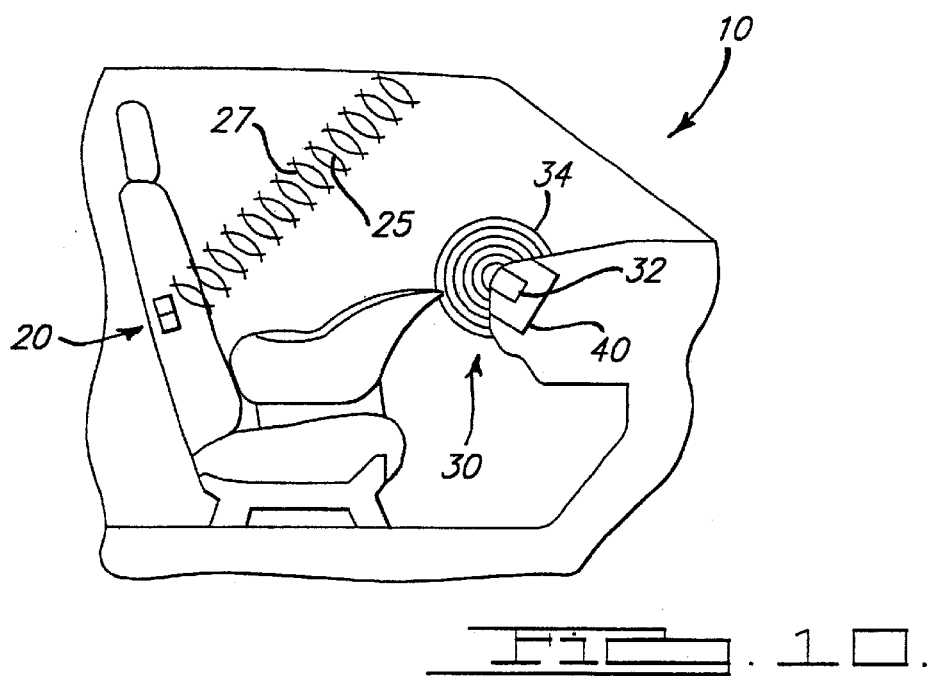
FIG. 10 illustrates a second aspect of instant invention incorporated in the passenger-side of a vehicle, with a rear facing infant seat (RFIS) on the seat.
Figure 11:
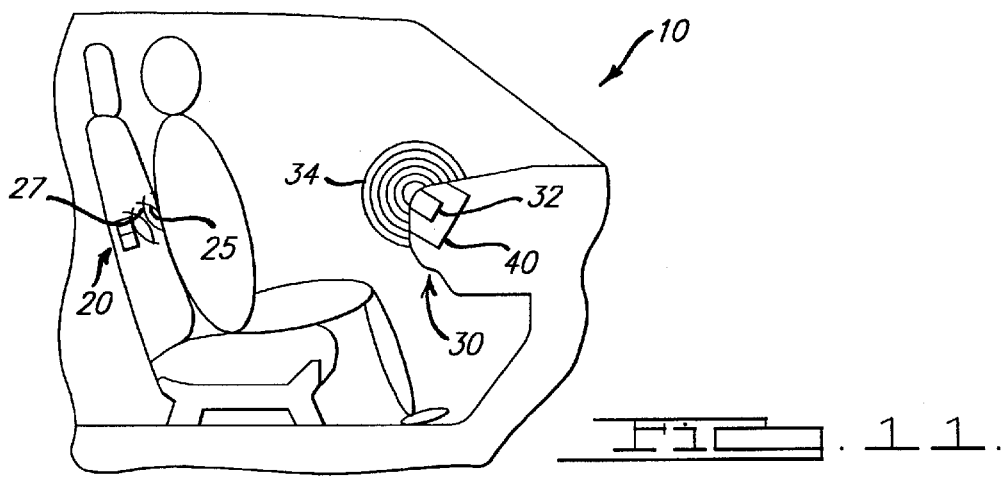
FIG. 11 illustrates a second aspect of instant invention incorporated in the passenger-side of a vehicle, with a normally seated occupant in the seat.
Figure 12:
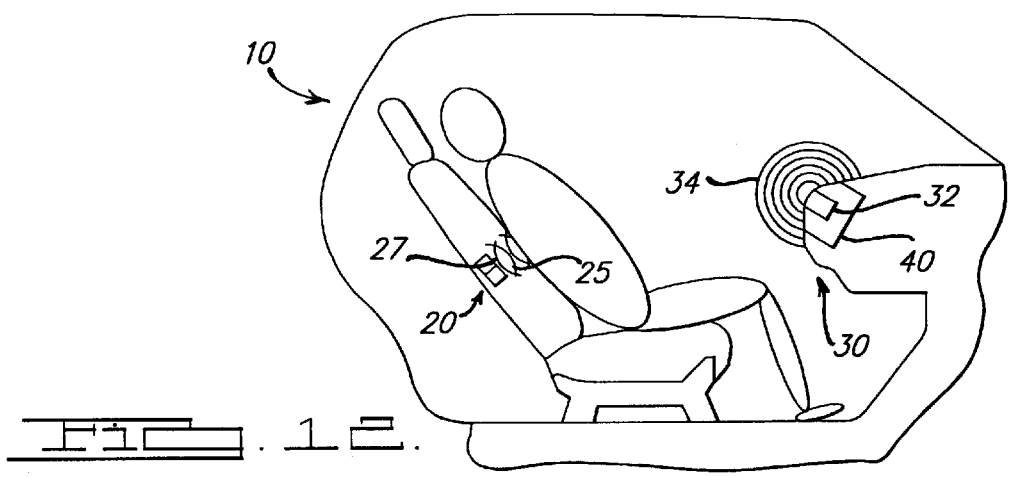
FIG. 12 illustrates a second aspect of instant invention incorporated in the passenger-side of a vehicle, with a rearward leaning occupant in the seat.
Figure 14:
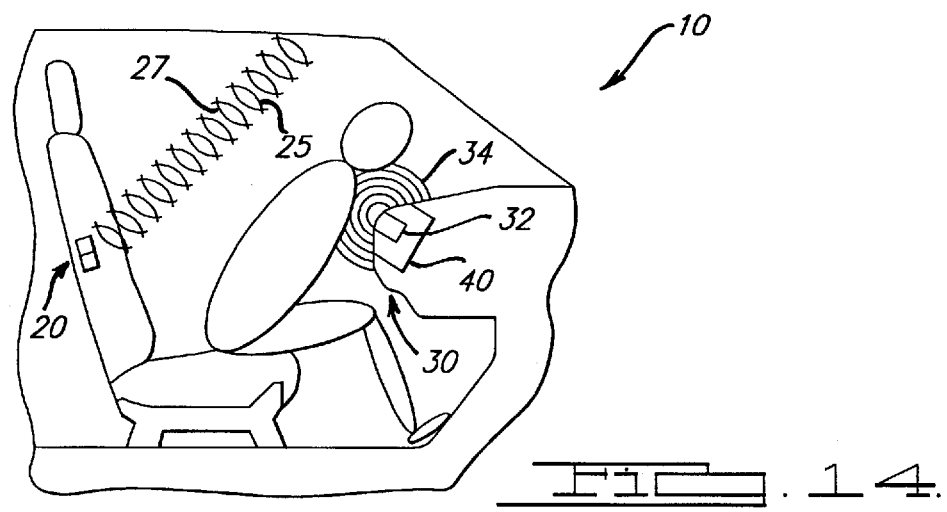
FIG. 14 illustrates a second aspect of instant invention incorporated in the passenger-side of a vehicle, with a substantially out-of-position forward leaning occupant in the seat wherein the occupant is proximate the at-risk zone of the air bag inflator.
Figure 18:
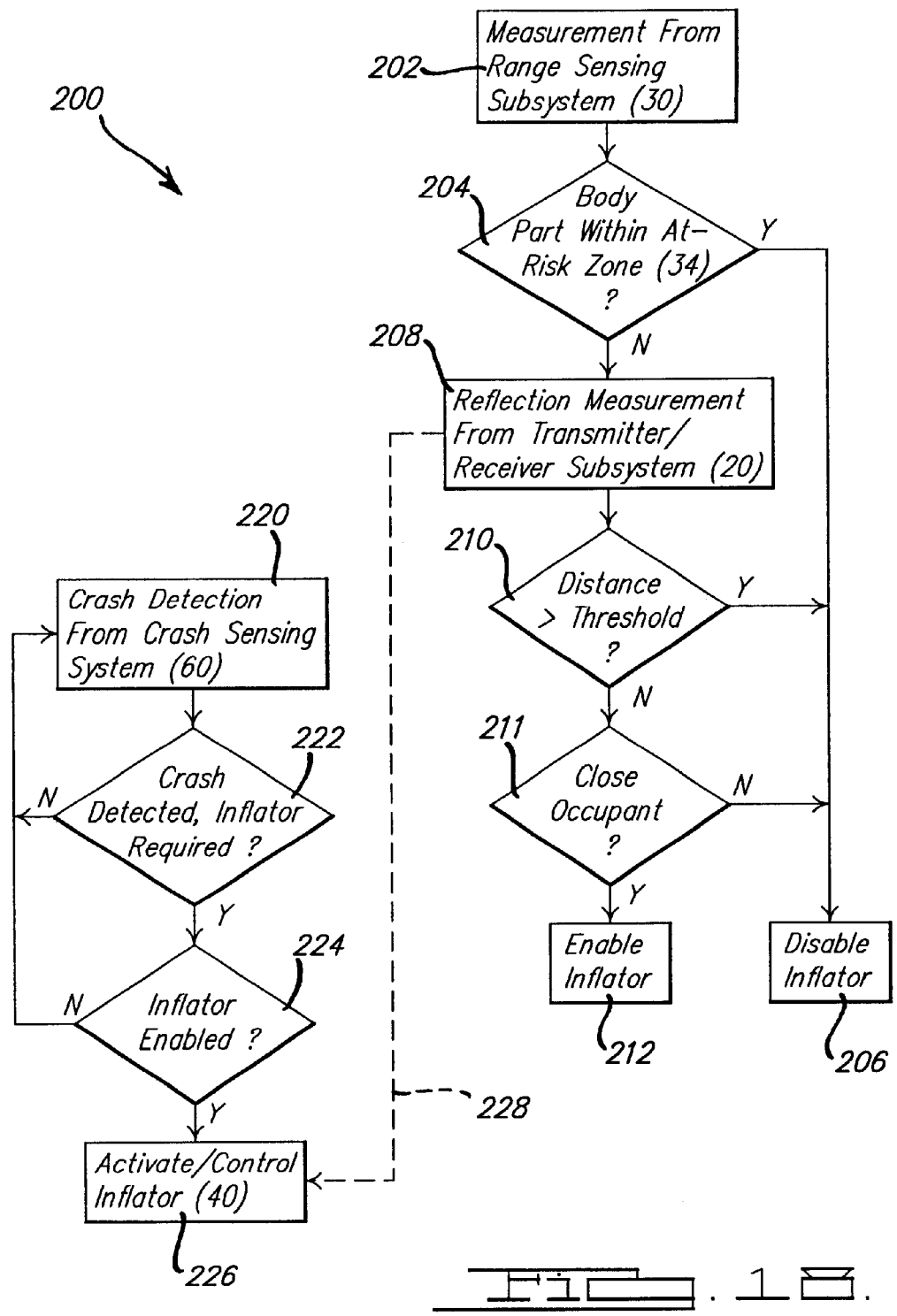
FIG. 18 illustrates a flow chart of control logic in accordance with the second aspect of the instant invention.

The occupant detection system 10 determines whether the air bag will deploy by assessing if there is a human body seated against the seat back or is very close to the air bag inflator 40. The enable decision for the air bag inflator 40 is in accordance with following system logic, as illustrated by the process (200) in FIG. 18:

a. If in step (204) from the measurement by the range/proximity sensing subsystem 30 in step (202) there is a body part too close to the air bag inflator 40, i.e. within the at-risk zone 34, then the air bag inflator 40 is disabled in step (206). This scenario is illustrated in FIG. 14. Alternately, the air bag inflator 40 is also disabled if an object such as a rear facing infant seat is detected within the at-risk zone 34, as is illustrated in FIG. 10.

b. Otherwise, if in step (210) from the reflection measurement of step (208) by the transmitter/receiver subsystem 20 the radar signal shows a significant reflection from a distance that is consistent with a reflection from the roof of the vehicle so as to indicate that there is no normally seated forward facing occupant seated against the seat back 26, then the air bag inflator 40 is disabled in step (206). This scenario is illustrated in FIGS. 9, 10, 13, and 14. Alternately, under these circumstances, the air bag inflator 40 can be activated with a softened inflation characteristic. For a convertible top vehicle with the top down, the algorithm could alternately only look for a large amplitude reflection very close to the seat back.

c. Otherwise, if in step (211) there is a large amplitude reflection from an object very close to the seat back and there is no reflection from a distance that is consistent with a reflection from the roof of the vehicle, indicating that there is an occupant seated against the seat back then the air bag inflator 40 is enabled in step (212). This scenario is illustrated in FIGS. 11 and 12. If in step (211) both the distance and the amplitude are less than respective thresholds, then the reflective object is assumed to be an inanimate object, causing the inflator to be disabled in step (206). The occupant detection system 10 may be further adapted to measure the period of time over which the distance exceeds a threshold, and to reduce the power of—or disable—the safety restraint system if the period of time exceeds a threshold.

Referring to FIG. 9, the transmitter/receiver subsystem 20, the range/proximity sensing subsystem 30, the air bag inflator 40 and a crash sensing subsystem 60 are operatively coupled to a controller 50 powered by a source of power 70. If in step (224) the air bag inflator 40 is enabled by transmitter/receiver subsystem 20 and the range/proximity sensing subsystem 30, in step (226) the controller 50 activates the air bag inflator 40 responsive to a crash of sufficient severity as detected by the crash sensing subsystem 60 in steps (220, 222). The air bag inflator 40 may comprise one or more inflator stages, wherein a multi-stage inflator provides for the control of the associated inflation characteristic by the controller 50, responsive (228) to the reflection measurement from the transmitter/receiver subsystem 20.

The occupant detection system 10 provides the appropriate enable decision for nearly all typical situations including situations for which the occupant is reclined back in the passenger seat, as illustrated in FIG. 12, or for which the occupant's head or torso are in the at-risk zone 34 of the air bag inflator 40, as illustrated in FIG. 14.

Figure 13:
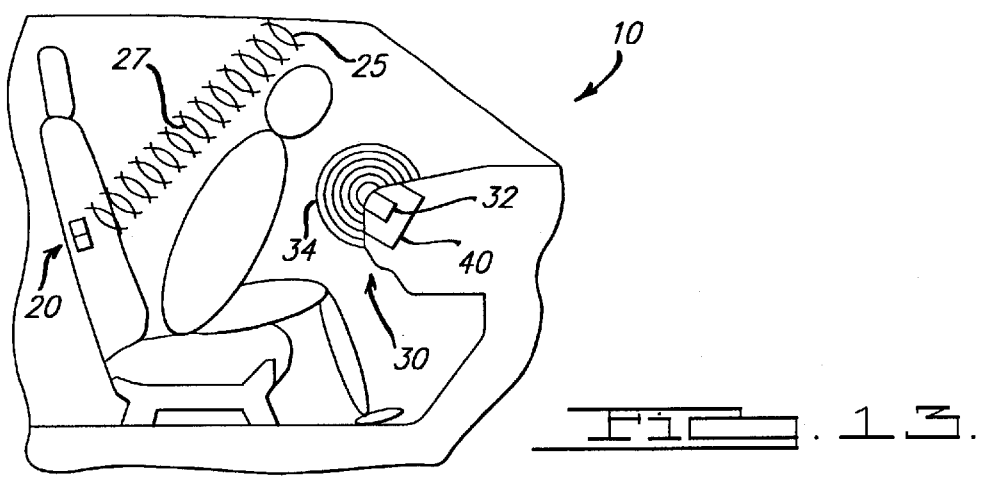
FIG. 13 illustrates a second aspect of instant invention incorporated in the passenger-side of a vehicle, with a forward leaning occupant in the seat.

Another situation that is possible, but less likely, occurs when the occupant is leaned forward, but not in the at-risk zone 34, as illustrated in FIG. 13. If this situation is only temporary, the air bag would stay enabled as long as the occupant is not detected in the at-risk zone 34. Alternately, for a safety restraint system with a controllable air bag inflator 40, the inflation characteristic may be softened. If this situation persists for many seconds, the system would either 1) be forced to assume that there is a rear facing infant seat and thus disable the air bag, or 2) activate the air bag inflator 40 with a softened inflation characteristic if the air bag inflator 40 is controllable.

Figure 15:
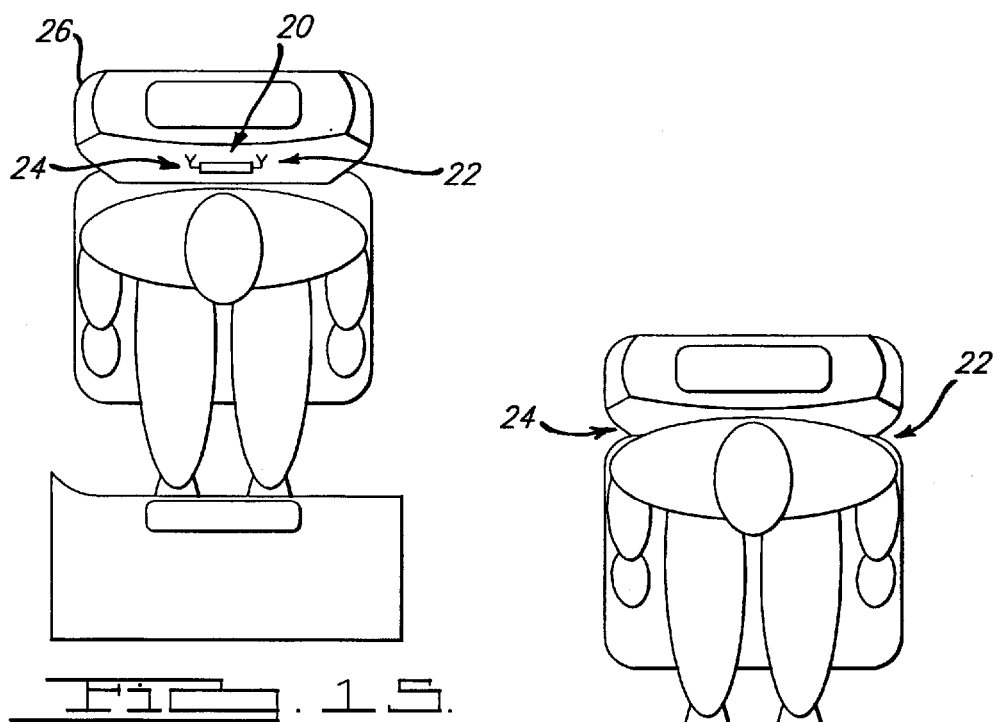
FIG. 15 illustrates a transmitter/receiver system mounted in the back of a seat with a seated occupant displaced therefrom, in accordance with a second aspect of the instant invention.
Figure 16:
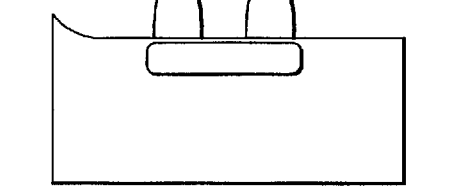
FIG. 16 illustrates a transmitter/receiver system mounted in the back of a seat with a seated occupant adjacent thereto, in accordance with a second aspect of the instant invention.

It may be possible for a normally seated occupant to move off to the side of the transmitter/receiver subsystem 20 if both the transmitting antenna and the receiving antenna are the same antenna or are placed very close to each other. It is therefore advantageous to laterally separate the two antennas transversely across the seat back. Referring to FIG. 15, if the antennas are separated by approximately eight inches, and are on either side of the center line of the seat back it is much more difficult for the RF energy to bypass the occupant's body. FIG. 16 illustrates that a normally seated occupant blocks both the transmitting and receiving antennas.

One of ordinary skill in the art will appreciate that the instant invention can be utilized with other types of safety restraint systems, besides air bag inflators, that are amenable to controllable actuation. Furthermore, transmitter/receiver and range/proximity sensors that utilize wave energy can be adapted to utilize any kind of wave energy, for example acoustic energy, audible acoustic energy, inaudible acoustic energy, ultrasonic acoustic energy, electromagnetic energy, radio frequency electromagnetic energy, light, visible light, invisible light, infrared electromagnetic energy, microwave electromagnetic energy, radar energy, pulsed energy, or continuous wave energy. Furthermore, these sensors may be adapted so as to be activated responsive to a crash sensor, for example a crash safing sensor, so that the occupant is not continuously exposed to the wave energy, but is exposed only when a crash is likely to occur. Furthermore, a lighting system for a vision based range/proximity sensor may also be so adapted.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A system for detecting an occupant in a vehicle and for controlling a safety restraint system responsive thereto, comprising:

a. a transmitter for transmitting wave energy;

b. a receiver for receiving said wave energy and for generating a signal responsive to said wave energy, wherein said transmitter and said receiver are disposed within the vehicle so that said wave energy from said transmitter to said receiver is intersected by a normally seated occupant on a seat of the vehicle and said wave energy is not intersected by an occupant positioned away from a back portion of said seat;

c. a range/proximity sensor for sensing if an object is within a region proximate to the safety restraint system, wherein the safety restraint system is disabled responsive to the detection of an object within said region by said range/proximity sensor; and d. a controller for controlling the power of the safety restraint system responsive to said signal responsive to said wave energy.

2. A system for detecting an occupant in a vehicle and for controlling a safety restraint system responsive thereto as recited in claim 1, wherein said wave energy is selected from the group consisting of acoustic energy, audible acoustic energy, inaudible acoustic energy, ultrasonic acoustic energy, electromagnetic energy, radio frequency electromagnetic energy, light, visible light, invisible light, infrared electromagnetic energy, microwave electromagnetic energy, radar energy, pulsed energy, and continuous wave energy.

3. A system for detecting an occupant in a vehicle and for controlling a safety restraint system responsive thereto as recited in claim 1, wherein said range/proximity sensor is selected from the group consisting of a capacitive sensor, an ultrasonic sensor, a vision system, a radar range finder, a passive infrared sensor, and an optical range finder.

4. A system for detecting an occupant in a vehicle and for controlling a safety restraint system responsive thereto as recited in claim 1, wherein said transmitter and said receiver are adapted so that said wave energy is reflected from at least one interior surface of the vehicle between said transmitter and said receiver.

5. A system for detecting an occupant in a vehicle and for controlling a safety restraint system responsive thereto as recited in claim 1, wherein at least one of said transmitter and said receiver incorporates a directional antenna.

6. A system for detecting an occupant in a vehicle and for controlling a safety restraint system responsive thereto as recited in claim 1, wherein said controller is not responsive to that portion of said wave energy that does not propagate directly between said transmitter and said receiver.

7. A system for detecting an occupant in a vehicle and for controlling a safety restraint system responsive thereto as recited in claim 6, wherein at least one of said transmitter and said receiver incorporates a non-directional antenna.

8. A system for detecting an occupant in a vehicle and for controlling a safety restraint system responsive thereto as recited in claim 1, wherein said range/proximity sensor detects if said object is animate, and the safety restraint system is disabled responsive to the detection of an animate object within said region by said range/proximity sensor.

9. A system for detecting an occupant in a vehicle and for controlling a safety restraint system responsive thereto, comprising:
   a. a transmitter for transmitting wave energy;
   b. a receiver for receiving said wave energy and for generating a signal responsive to said wave energy, wherein said transmitter and said receiver are disposed within the vehicle so that said wave energy from said transmitter to said receiver is intersected by a normally seated occupant on a seat of the vehicle, and the line of sight between said transmitter and said receiver is not intersected by a rear facing infant seat on said seat of the vehicle;
   c. a range/proximity sensor for sensing if an object is within a region proximate to the safety restraint system, wherein the safety restraint system is disabled responsive to the detection of an object within said region by said range/proximity sensor; and
   d. a controller for controlling the power of the safety restraint system responsive to said signal responsive to said wave energy.

10. A system for detecting an occupant in a vehicle and for controlling a safety restraint system responsive thereto, comprising:
    a. a transmitter for transmitting wave energy;
    b. a receiver for receiving said wave energy and for generating a signal responsive to said wave energy, wherein said transmitter and said receiver are disposed within the vehicle so that said wave energy from said transmitter to said receiver is intersected by a normally seated occupant on a seat of the vehicle;
    c. a range/proximity sensor for sensing if an object is within a region proximate to the safety restraint system, wherein the safety restraint system is disabled responsive to the detection of an object within said region by said range/proximity sensor; and
    d. a controller for controlling the power of the safety restraint system responsive to said signal responsive to said wave energy, wherein the frequency of said wave energy is adapted so that said wave energy is at least partially absorbed by a human body, said controller measures the attenuation of said wave energy from said signal and reduces the power of the safety restraint system responsive to said attenuation being less than a threshold.

11. A system for detecting an occupant in a vehicle and for controlling a safety restraint system responsive thereto as recited in claim 10, wherein the safety restraint system is disabled responsive to said attenuation being less than a threshold.

12. A system for detecting an occupant in a vehicle and for controlling a safety restraint system responsive thereto, comprising:
    a. a transmitter for transmitting wave energy;
    b. a receiver for receiving said wave energy and for generating a signal responsive to said wave energy, wherein said transmitter and said receiver are disposed within the vehicle so that said wave energy from said transmitter to said receiver is intersected by a normally seated occupant on a seat of the vehicle, one of said transmitter and said receiver is mounted in a headliner portion of the vehicle and the other of said transmitter and said receiver is mounted in a back portion of said seat;
    c. a range/proximity sensor for sensing if an object is within a region proximate to the safely restraint system, wherein the safely restraint system is disabled responsive to the detection of an object within said region by said range/proximity sensor; and
    d. a controller for controlling the power of the safety restraint system responsive to said signal responsive to said wave energy.

13. A system for detecting an occupant in a vehicle and for controlling a safety restraint system responsive thereto, comprising:
    a. a transmitter for transmitting wave energy;
    b. a receiver for receiving said wave energy and for generating a signal responsive to said wave energy, wherein said transmitter and said receiver are disposed within the vehicle so that said wave energy from said transmitter to said receiver is intersected by a normally seated occupant on a seat of the vehicle, said transmitter and said receiver are adapted so that said wave energy is reflected from at least one interior surface of the vehicle between said transmitter and said receiver, one of said transmitter and receiver is mounted in an instrument panel portion of the vehicle and the other of said transmitter and said receiver is mounted in a back portion of said seat;
    c. a range/proximity sensor for sensing if an object is within a region proximate to the safety restraint system, wherein the safety restraint system is disabled responsive to the detection of an object within said region by said range/proximity sensor; and
    d. a controller for controlling the power of the safety restraint system responsive to said signal responsive to said wave energy.

14. A system for detecting an occupant in a vehicle and for controlling a safety restraint system responsive thereto, comprising:

a. a transmitter for transmitting wave energy;
b. a receiver for receiving said wave energy and for generating a signal responsive to said wave energy, wherein said transmitter and said receiver are disposed within the vehicle so that said wave energy from said transmitter to said receiver is intersected by a normally seated occupant on a seat of the vehicle;
c. a range/proximity sensor for sensing if an object is within a region proximate to the safety restraint system, wherein the safety restraint system is disabled responsive to the detection of an object within said region by said range/proximity sensor;
d. a controller for controlling the power of the safety restraint system responsive to said signal responsive to said wave energy, wherein said controller is not responsive to that portion of said wave energy that does not propagate directly between said transmitter and said receiver; and
e. a second transmitter, wherein the line-of-sight between said second transmitter and said receiver is not blocked by an occupant seated on said seat and said controller is responsive to the signal from said second transmitter.

15. A system for detecting an occupant in a vehicle and for controlling a safety restraint system responsive thereto as recited in claim 14, wherein said second transmitter is located behind a back portion of said seat.

16. A system for detecting an occupant in a vehicle and for controlling a safety restraint system responsive thereto, comprising:
a. a transmitter for transmitting wave energy;
b. a receiver for receiving said wave energy and for generating a signal responsive to said wave energy, wherein said transmitter and said receiver are disposed within the vehicle so that said wave energy from said transmitter to said receiver is intersected by a normally seated occupant on a seat of the vehicle, said transmitter is disposed in a back portion of said seat so as to transmit said wave energy upwards from and forward of said back portion and said receiver is disposed in said back portion of said seat so as to receive said wave energy that is reflected by a reflective surface;
c. a range/proximity sensor for sensing if an object is within a region proximate to the safety restraint system, wherein the safety restraint system is disabled responsive to the detection of an object within said region by said range/proximity sensor; and
d. a controller for controlling the power of the safety restraint system responsive to said signal responsive to said wave energy.

17. A system for detecting an occupant in a vehicle and for controlling a safety restraint system responsive thereto as recited in claim 16, wherein said transmitter and said receiver constitute a microwave radar and said wave energy is at least partially reflected by a human body.

18. A system for detecting an occupant in a vehicle and for controlling a safety restraint system responsive thereto as recited in claim 16, wherein said transmitter and said receiver are laterally displaced from one another within said back portion.

19. A system for detecting an occupant in a vehicle and for controlling a safety restraint system responsive thereto as recited in claim 16, wherein if the amplitude of said signal exceeds a first threshold and a distance to said reflective surface determined by said controller from said signal exceeds a second threshold, then said controller reduces the power of the safety restraint system.

20. A system for detecting an occupant in a vehicle and for controlling a safety restraint system responsive thereto as recited in claim 19, wherein the operation of reducing the power of the safety restraint system comprises disabling the safety restraint system.

21. A system for detecting an occupant in a vehicle and for controlling a safety restraint system responsive thereto as recited in claim 19, wherein the controller measures the period of time over which said distance exceeds a second threshold, and said power of the safety restraint system is reduced after said period of time exceeds a third threshold.

22. A system for detecting an occupant in a vehicle and for controlling a safety restraint system responsive thereto as recited in claim 21, wherein the safety restraint system is disabled after said period of time exceeds a third threshold.

23. A method of detecting an occupant in a vehicle and for controlling the actuation of a safety restraint system responsive thereto, comprising
a. transmitting a wave signal from a transmitter to a receiver, wherein said transmitter and receiver are disposed in relation to a seat in the vehicle so that the path therebetween is intersected by a normally seated occupant in said seat of the vehicle;
b. measuring the attenuation of said wave signal from a signal from said receiver;
c. detecting if an object is within a region proximate to the safety restraint system, wherein an occupant positioned within said region would be at risk of injury from the safety restraint system;
d. disabling the actuation of the safety restraint system responsive to the detection of an object within said region; and
e. controlling the power of the safety restraint system responsive to the attenuation of said wave signal.

24. A method of detecting an occupant in a vehicle and for controlling the actuation of a safety restraint system responsive thereto as recited in claim 23, wherein the power of the safety restraint system is reduced responsive to said attenuation being less than a threshold.

25. A method of detecting an occupant in a vehicle and for controlling the actuation of a safety restraint system responsive thereto as recited in claim 24, wherein the safety restraint system is disabled responsive to the attenuation of said wave signal being less than a threshold.

26. A method of detecting an occupant in a vehicle and for controlling the actuation of a safety restraint system responsive thereto as recited in claim 23, wherein said path extends between a back portion of said seat and a fixed portion of the vehicle located above and forward of said seat.

27. A method of detecting an occupant in a vehicle and for controlling the actuation of a safety restraint system responsive thereto as recited in claim 23, wherein said path is adapted so as to not be intersected by an occupant positioned so as to be at-risk of injury from the deployment of the safety restraint system.

28. A method of detecting an occupant in a vehicle and for controlling the actuation of a safety restraint system responsive thereto as recited in claim 27, wherein said path is adapted so as to not be intersected by a rear facing infant seat on said seat of the vehicle.

29. A method of detecting an occupant in a vehicle and for controlling the actuation of a safety restraint system responsive thereto as recited in claim 23, wherein the attenuation of said wave signal between said transmitter and said receiver is measured within a period of time, and said period of time is adapted so as to ignore multi-path signals from said transmitter to said receiver.

30. A method of detecting an occupant in a vehicle and for controlling the actuation of a safety restraint system responsive thereto as recited in claim 23, further comprising the operation of measuring the duration of time over which the attenuation of said wave signal is less then a threshold, wherein the power of the safety restraint system is reduced responsive to said duration of time exceeding a threshold.

31. A method of detecting an occupant in a vehicle and for controlling the actuation of a safety restraint system responsive thereto as recited in claim 30, wherein the safety restraint system is disabled responsive to said duration of time exceeding a threshold.

32. A method of detecting an occupant in a vehicle and for controlling the actuation of a safety restraint system responsive thereto, comprising:

a. transmitting a wave signal from a transmitter;
   b. reflecting a portion of said wave signal with a reflective surface, and receiving said reflected portion of said wave signal with a receiver, wherein said transmitter and receiver are disposed in a back portion of a seat in the vehicle so that said wave signal from said transmitter is reflected by a normally seated occupant in said seat;
   c. detecting if an object is within a region proximate to the safety restraint system, wherein an occupant positioned within said region would be at risk of injury from the safety restraint system;
   d. disabling the actuation of the safety restraint system responsive to the detection of an object within said region; and
   e. controlling the power of the safety restraint system responsive to said reflected portion of said wave signal that is received by said receiver.

33. A method of detecting an occupant in a vehicle and for controlling the actuation of a safety restraint system responsive thereto as recited in claim 32, wherein said transmitter is disposed so as to transmit said wave energy upwards and forwards of said back portion of said seat.

34. A method of detecting an occupant in a vehicle and for controlling the actuation of a safety restraint system responsive thereto as recited in claim 32, further comprising the operation of determining the distance from said transmitter to said reflective surface, and reducing the power of the safety restraint system if said distance is greater than a threshold.

35. A method of detecting an occupant in a vehicle and for controlling the actuation of a safety restraint system responsive thereto as recited in claim 34, wherein the safety restraint system is disabled if said distance is greater than a threshold.

36. A method of detecting an occupant in a vehicle and for controlling the actuation of a safety restraint system responsive thereto as recited in claim 32, further comprising the operation of determining the amplitude of said reflected portion of said wave signal, and reducing the power of the safety restraint system if said amplitude is less than a threshold.

37. A method of detecting an occupant in a vehicle and for controlling the actuation of a safety restraint system responsive thereto as recited in claim 36, wherein the safety restraint system is disabled if said amplitude is less than a threshold.

* * * * *

UNITED STATES PATENT AND TRADEMARK OFFICE
CERTIFICATE OF CORRECTION

PATENT NO. : 6,220,627 B1
DATED : April 24, 2001
INVENTOR(S) : Stanley

It is certified that error appears in the above-identified patent and that said Letters Patent is hereby corrected as shown below:

<u>Title page,</u>
Item [73] Assignee: should read -- Automotive Systems Laboratory, Inc., Farmington Hills, MI --

Signed and Sealed this

Twelfth Day of February, 2002

Attest:

JAMES E. ROGAN
*Director of the United States Patent and Trademark Office*

*Attesting Officer*